United States Patent
Han et al.

(10) Patent No.: US 6,490,155 B2
(45) Date of Patent: Dec. 3, 2002

(54) DETACHABLE COUPLING FOR HANDHELD COMPUTER AND PERIPHERAL ATTACHMENT SCHEME

(75) Inventors: Amy Han, Palo Alto; Philip S. McClendon, Cupertino; Michael Sholl, Berkeley, all of CA (US); Sajid Patel, Des Plaines, IL (US); Lawrence Lam, San Jose, CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/745,325

(22) Filed: Dec. 20, 2000

(65) Prior Publication Data

US 2002/0054476 A1 May 9, 2002

(51) Int. Cl.[7] .................................................. G06F 1/16
(52) U.S. Cl. .................. 361/686; 361/683; 235/472.01; D14/242; 312/223.1
(58) Field of Search .................. 361/686, 683, 361/687, 680, 681, 682; 312/223.1; 292/8, 30; 235/375, 462, 472.01; D14/100, 106, 107, 242; 713/321; 439/341

(56) References Cited

U.S. PATENT DOCUMENTS

| | | | |
|---|---|---|---|
| 3,744,034 A | 7/1973 | Paul | 340/172.5 |
| 3,815,944 A | 6/1974 | Noga | 292/261 |
| 4,659,159 A * | 4/1987 | Takahashi | 339/75 M |
| 4,860,372 A | 8/1989 | Kuzunuki et al. | 382/13 |
| 4,969,830 A * | 11/1990 | Daly et al. | 439/136 |
| 4,972,496 A | 11/1990 | Sklarew | 382/13 |
| 5,227,953 A * | 7/1993 | Lindberg et al. | 361/686 |
| 5,231,381 A | 7/1993 | Duwaer | 340/712 |
| 5,305,394 A | 4/1994 | Tanaka | 382/13 |
| D351,841 S | 10/1994 | Blankenship et al. | D14/107 |
| 5,384,686 A * | 1/1995 | Mesfin et al. | 361/686 |
| 5,389,745 A | 2/1995 | Sakamoto | 178/18 |
| 5,434,929 A | 7/1995 | Beernink et al. | 382/187 |
| 5,444,192 A | 8/1995 | Shetye et al. | 178/18 |
| 5,452,371 A | 9/1995 | Bozinovic et al. | 382/187 |
| 5,467,504 A | 11/1995 | Yang | 16/342 |
| 5,477,415 A * | 12/1995 | Mitcham et al. | 361/686 |
| 5,488,575 A | 1/1996 | Danielson et al. | 361/683 |
| 5,497,339 A * | 3/1996 | Bernard | 361/686 |
| 5,515,303 A | 5/1996 | Cargin, Jr. et al. | 361/686 |
| 5,528,743 A | 6/1996 | Tou et al. | 395/148 |
| 5,534,892 A | 7/1996 | Tagawa | 345/173 |
| 5,564,055 A | 10/1996 | Asnaashari et al. | 395/800 |
| 5,615,284 A | 3/1997 | Rhyne et al. | 382/187 |
| 5,621,817 A | 4/1997 | Bozinovic et al. | 382/189 |
| 5,627,727 A * | 5/1997 | Aguilera et al. | 361/686 |
| 5,630,148 A | 5/1997 | Norris | 395/750 |
| 5,661,632 A | 8/1997 | Register | 361/683 |
| 5,698,822 A | 12/1997 | Haneda et al. | 178/18 |
| 5,715,410 A | 2/1998 | Kim | 395/309 |
| 5,737,339 A | 4/1998 | Goto et al. | 371/21.2 |
| 5,737,541 A * | 4/1998 | Shimizu et al. | 361/686 |
| 5,751,546 A * | 5/1998 | Clark et al. | 361/686 |
| 5,757,616 A | 5/1998 | May et al. | 361/683 |
| 5,841,901 A | 11/1998 | Arai et al. | 382/187 |
| 5,859,628 A * | 1/1999 | Ross et al. | 361/686 |
| D408,417 S | 4/1999 | Ota et al. | D14/242 |

(List continued on next page.)

Primary Examiner—Darren Schuberg
Assistant Examiner—Lisa Lea-Edmonds
(74) Attorney, Agent, or Firm—Van Mahamedi; Hickman Palermo Truong & Becker LLP

(57) ABSTRACT

A peripheral device and attachment scheme is provided to enable peripheral devices to be detachably coupled to handheld computers. The attachment scheme enables a peripheral device to be piggy-backed with a handheld computer, with the two devices being connected so that the front face of the peripheral device is adjacent a back surface of the handheld computer. The peripheral attachment scheme includes a moveable latch element that is actuable through insertion of a laterally positioned mechanism. An operator may engage and disengage the latch element with the handheld computer with one hand.

17 Claims, 5 Drawing Sheets

U.S. PATENT DOCUMENTS

| | | | |
|---|---|---|---|
| 5,890,799 A | | 4/1999 | Yiu et al. .................... 364/707 |
| 5,949,408 A | | 9/1999 | Kang et al. ................. 345/169 |
| 5,964,601 A | * | 10/1999 | Tsurumaru et al. ......... 439/141 |
| 5,996,080 A | | 11/1999 | Silva et al. ................. 345/169 |
| 5,996,956 A | * | 12/1999 | Shawver ..................... 361/686 |
| 6,042,414 A | * | 3/2000 | Kunert ....................... 439/374 |
| 6,052,279 A | | 4/2000 | Friend et al. ............... 361/686 |
| 6,115,248 A | * | 9/2000 | Canova et al. .............. 361/686 |
| 6,119,184 A | * | 9/2000 | Takahama ................... 361/686 |
| 6,135,801 A | * | 10/2000 | Helot et al. ................. 439/341 |
| 6,185,095 B1 | * | 2/2001 | Helot et al. ................. 361/686 |
| 6,275,378 B1 | * | 8/2001 | Lee et al. .................... 361/686 |
| 6,282,008 B1 | * | 8/2001 | Canova et al. .............. 361/686 |

\* cited by examiner

DETACHABLE COUPLING FOR HANDHELD COMPUTER AND PERIPHERAL ATTACHMENT SCHEME

This application incorporates by reference the following applications:

U.S. patent application Ser. No. 09/612,017, filed Jul. 7, 2000, entitled Detachable Securement of an Accessory Device to a Handheld Computer, naming Canova et al. as inventors;

U.S. patent application Ser. No. 09/313,333, now issued as U.S. Pat. No. 6,115, 248, entitled "Detachable Securement of an Accessory Device to a Handheld Computer", filed on May 17, 1999, and naming Canova et al. as investors.

BACKGROUND OF THE INVENTION

1. Field of the Invention

This invention relates to the field of peripheral devices for handheld computers. In particular, the invention relates to coupling mechanisms for attaching peripheral devices to handheld computers.

2. Description of the Related Art

A principal feature of handheld computers is portability. To this end, functions and features of handheld computers are sometimes sacrificed to maintain the handheld computer in a small, compacted state. Additional features and functions of the handheld computer may be added by linking the handheld computer to a peripheral or accessory device. Examples of such peripheral devices includes modem devices and communication cradles.

Previous peripheral devices have generally been immobile, so that the handheld computer had to use the peripheral device as a docking port or station. However, the widespread use of computers and computer networks has resulted in a need for peripheral devices that are portable. Therefore, there is an increasing need for enabling peripheral devices to securely couple with a handheld computer without hindering the portability of the handheld computer.

Other previous peripheral devices that have been designed to be portable with the handheld computer have relied on coupling mechanism that allows the peripheral device to couple with the handheld computer by first placing the handheld computer on the peripheral device, and then maneuvering portions of the peripheral device around the handheld computer to secure it with the peripheral devices. Such coupling mechanisms are overly complicated, requiring the user to perform too many steps and maneuvers to secure the peripheral device with the handheld computer. Requiring additional steps to secure the peripheral device with the handheld computer leaves the handheld computer prone to being dropped prior to it being secured. This is especially problematic considering that these peripheral devices require a free hand from the user for the sole purpose of manipulating portions of the peripheral device to secure the handheld computer.

FIG. 8 illustrates a handheld computer 300, for use with peripheral devices, as described with embodiment of the invention. The handheld computer 300 may be coupled to an accessory device 350 through a coupling mechanism such as described in U.S. Pat. No. 6,115,248 (incorporated by reference herein). Examples of handheld computers 300 include palm style computers such as a PalmPilot®, Palm III®, or Palm V®, or Palm VII® organizers, manufactured by Palm Inc. Other types of handheld computers include devices operating under Windows CE™ or PocketPC® operating systems. Still further, handheld computers may include wireless devices such as cell-phones and wireless access protocol (WAP) enabled devices.

The handheld computer 300 may include interactive hardware and software that perform functions such as maintaining calendars and phone lists. The handheld computer 300 shown in FIG. 8 includes a plurality of input functions keys 317, a rocking switch 231, and a display 313 having graphic user interface features. The display 313 may be provided with an interface that allows the user to select and alter displayed content using a pointer such as a stylus. In one example, the display 313 includes a Graffiti® writing section 318 for tracing alphanumeric characters as input. A plurality of input buttons 319 for performing automated or pre-programmed functions may be provided on a portion of the display 313.

SUMMARY OF THE INVENTION

A peripheral device and attachment scheme is provided to enable peripheral devices to be detachably coupled to handheld computers. The attachment scheme enables a peripheral device to be piggy-backed with a handheld computer, with the two devices being connected so that the front face of the peripheral device is adjacent a back surface of the handheld computer. The peripheral attachment scheme includes a moveable latch element that is actuable through insertion of a laterally positioned mechanism. An operator may engage and disengage the latch element with the handheld computer with one hand.

In an embodiment, the attachment scheme includes one or more push members that can be pushed into a housing of the peripheral device. The push members cause a translational component to move vertically. The movement of the translational component coincides with the latch elements moving between engaged and disengaged positions. The movement of the latch elements allows for the peripheral device to detachably latch into the handheld computer.

DETAILED DESCRIPTION

A. System Overview

Figure 1:
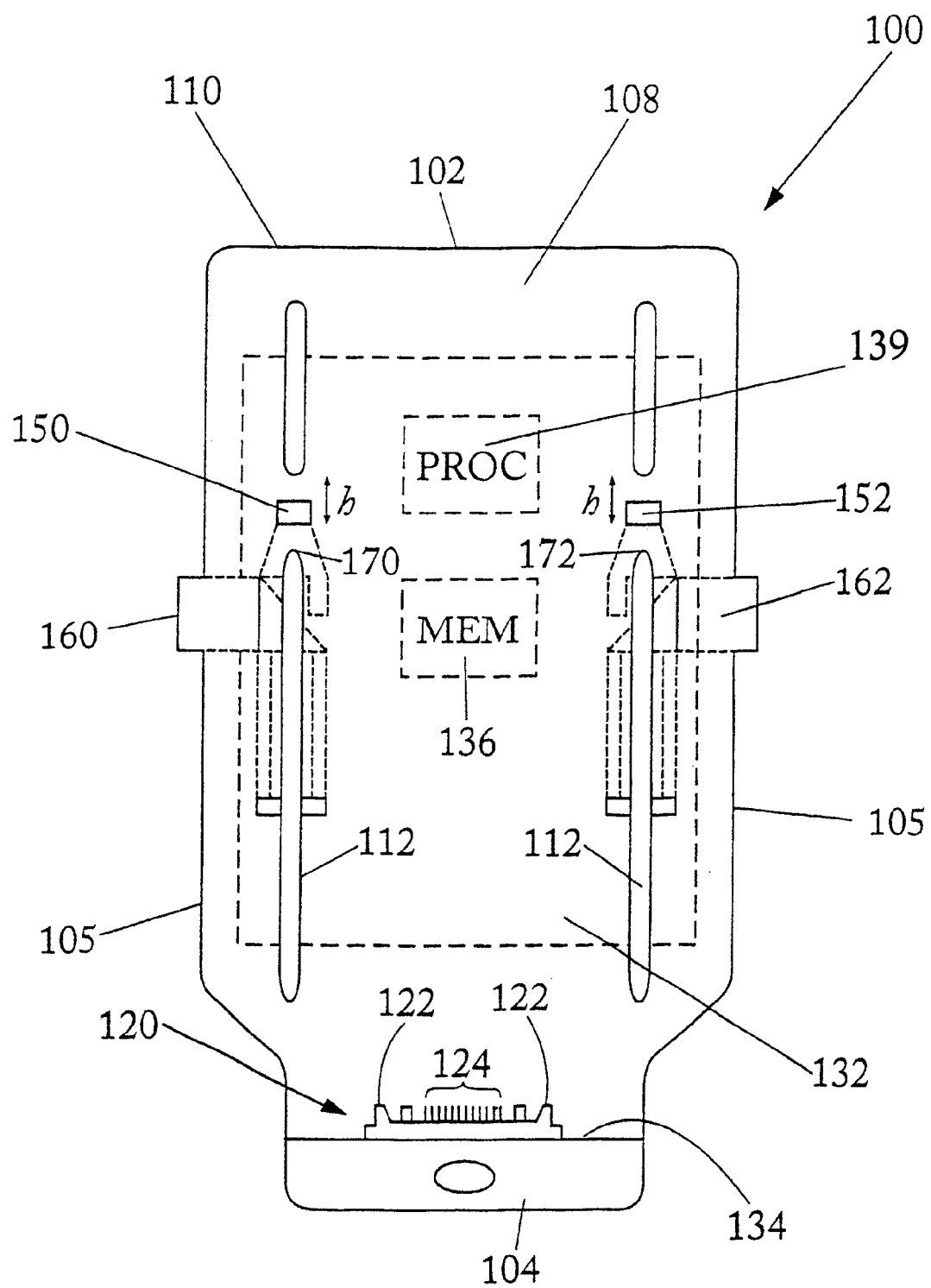
FIG. 1 is a frontal view of a peripheral device, under an embodiment of the invention.

Embodiments of the invention include a peripheral device with a coupling mechanism for detachably coupling the peripheral device to a handheld computer. The peripheral device may include a housing having a front face. When the peripheral device is coupled to the handheld computer, the front face abuts a back surface of a handheld computer. A connector may be accessible from the front face of the peripheral device to extend communications with the handheld computer. One or more moveable latch elements are included with the peripheral device to couple the front face of the peripheral device with the back surface of the handheld computer. The latch element may protrude from the front face of the peripheral device to extend into the back surface of the handheld computer. One or more push members are positioned on the housing, preferably on one or both of the lateral sides of the housing. The push members are configured to cause the latch elements to move into position for engaging mating apertures on the handheld computer, so as to couple the peripheral device to the handheld computer.

In another embodiment, a peripheral device is provided for a handheld computer. The handheld computer may include a front surface that provides access to a display, a back surface that opposes the front surface. The handheld computer may also include a top surface and a bottom surface, corresponding to a top-down orientation of the display where manual input is received and characters displayed. The peripheral device includes a housing having a first face, a top and a bottom defining a length of the housing, a first lateral side and a second lateral side defining a width of the housing. The peripheral device includes a coupling mechanism that is actuable on at least the first lateral side or the second lateral side. The coupling mechanism includes a connection member that is insertable into a mating aperture on the back side of the housing upon the coupling mechanism being actuated. The connection member is oriented so that the peripheral device is coupleable with the handheld computer with the first face being adjacent the back surface of the handheld computer.

The peripheral device may be used with handheld computers, including devices using a Palm OS®, or Windows CE® or Pocket PC® operating systems. Other examples of handheld computers include for use with embodiments of the invention include smart cell phones and other wireless access protocol enabled (WAP) devices. In an embodiment, the peripheral device provides functionality to the handheld computer, such as by providing extra processing and memory resources. Specific applications of the peripheral device include use as standard or wireless modem, a global positioning system, a cellular phone, or as a battery unit or recharger. Still further, the peripheral device may include processing or memory resources for performing other functions and tasks. While the peripheral device is assumed to function with the handheld computer, it is possible for the peripheral device to operate independently of the handheld computer, but be carried with the handheld computer for convenience.

Embodiments of the invention provide several advantages over other peripheral devices and coupling mechanisms. Among them, users can attach a peripheral device to a handheld computer with minimal effort. Under one embodiment, a user can grip a peripheral device on its side and cause the peripheral device to be attached to the handheld computer.

Still further, the peripheral device and handheld computer can be coupled with the user holding the peripheral device in one hand and the handheld computer in another hand. The user can couple the two devices by bringing the two devices together in an alignment where the latch elements on the peripheral device can latch into mating apertures of the handheld computer. During the motion of bringing the devices together in separate hands, the user may press or otherwise push a member into the peripheral device to move the latch elements into an engaged position for inserting into the mating apertures of the handheld computer. In an embodiment, the two devices can be brought together and coupled with the user effectuating the coupling mechanism by gripping the peripheral device.

The motion required to couple the handheld computer and peripheral device does not require the user to switch the handheld computer or peripheral device from one hand to another. The user does not need to hold both devices in one hand while effectuating the coupling mechanism. Furthermore, the user does not need to rotate either the handheld computer or the peripheral device. The result is that the peripheral device and the handheld computer can be attached and detached easily, while minimizing the possibility that one or both devices are dropped. In cases where the peripheral device includes an electrical connector, the coupling mechanism described with embodiments of the invention minimize the possibility that the electrical connection is not made through an ineffective mechanical coupling.

Similarly, the handheld computer and the peripheral device may be decoupled easily. In an embodiment, a push member is gripped and the peripheral device is disengaged from the handheld computer. The decoupling can be achieved while gripping the peripheral device and the handheld computer in separate hands.

Furthermore, embodiments of the invention provide a push member that can be actuated by gripping the peripheral device along its lateral edges. The push member can be actuated to make the latch members engage mating apertures on the handheld computer. The push members can be actuated by users using ergonomic placement of hands.

In addition, embodiments of the invention may employ multiple latch elements that are distributed on a surface of the peripheral device to form a more balanced coupling between the handheld computer and the peripheral device. In one embodiment, two latch elements are positioned symmetrically across an upper portion of the front face for the peripheral device. The result is that the peripheral device can achieve a secure detachable coupling with the handheld computer.

Another advantage provided under an embodiment of the invention is that a peripheral device is provided with a coupling mechanism that is actuable from a lateral side of a housing. Positioning the actuable member on the lateral side of the housing is advantageous because the coupling mechanism can be actuated with the user maintaining a natural and ergonomic grip on the lateral sides of the housing. Positioning the actuable member on the lateral side of the housing enables the user to detachable couple the peripheral device with the handheld computer while minimizing the number of hand adjustments required to manipulate one or both the devices into a configuration for coupling them together.

B. Peripheral Device with Coupling Mechanism

FIG. 1 is a front view of a peripheral device 100, under an embodiment of the invention The peripheral device 100 is an accessory device for extending communications and functionality to handheld computers. As shown by FIG. 1, peripheral device 100 includes a housing 110, having a top 102, a bottom 104, a pair of lateral sides 105 extending between the top and bottom. The top 102 and bottom 104 define a length of the peripheral device 100. The lateral sides 105 define a width of the peripheral device 100. The housing 110 includes a front face 108 and aback face 118 (see FIG. 2). One or more electrical elements may be retained within the housing 10, including for example, a printed circuit board 132, a processor 139, and a memory component 136. The shape of the peripheral device 100 generally matches the form factor of the handheld computer, so tat the peripheral device 100 and the handheld computer can be carried in a single hand, or together as one unit. In particular, the peripheral device 100 is designed to piggy-back with handheld computers, to minimize the overall form factor of the handheld computer and peripheral device combination.

The front face 108 of the peripheral device 100 includes alignment rails 112, 112 that are positioned to meet corresponding elongated impressions on a back surface of the handheld computer. A connector 120 is provides to connect with a serial connector of the handheld computer. The connector 120 is accessible on a ledge 134 that supports the handheld computer from the bottom. Preferably, connector 120 includes members 122 that attach to corresponding slots in the handheld computer to mechanically secure the handheld computer with the peripheral device. In addition, the connector 120 includes a contact structure having a plurality of electrical contacts 124. In an embodiment, the plurality of electrical contacts 124 require a positive mating force to mate with corresponding contact elements of the handheld computer.

While connector 120 may in some embodiments be used to mechanically retain the peripheral device 100 with the handheld computer, embodiments of the invention employ another coupling mechanism to retain the front face 108 of the peripheral device 100 against the back face of the handheld computer. In an embodiment, front face 108 provides one or more latch elements 150, 152 that are moveable vertically between top 102 and bottom 104. The latch elements 150, 152 are moveable to engage and latch corresponding mating apertures on the back surface of the handheld computer.

In an embodiment, the latch elements 152 are moveable a vertical height h through a combination of interior elements. The interior elements enable a user to easily control the peripheral device in latching and unlatching with the handheld computer. Preferably, the user can control the coupling mechanism of the peripheral device 100 with one hand.

The coupling mechanism includes a first push member 160 and a second push member 162. The first push member 160 and second push member 162 extend from opposite lateral sides 105. The push members 160, 162 are pushable into and out of the housing 110 of the peripheral device 100. Each pushable member 160, 162 can be pushed into a translational component 170, 172 (shown in phantom). The translational components 170, 172 can be moved laterally to cause latch element 150, 152 to move up or down.

Figure 2:
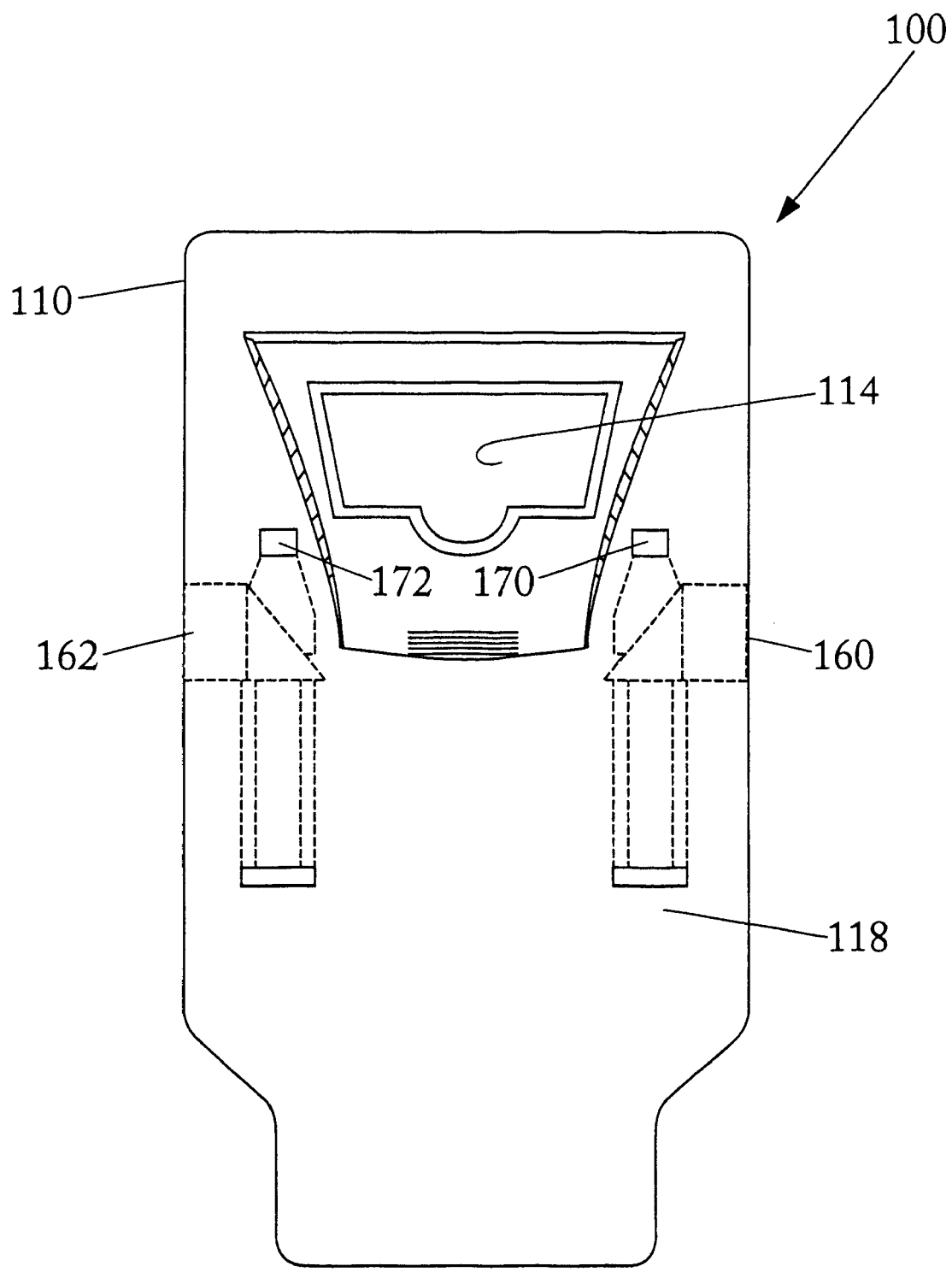
FIG. 2 is a back view of a peripheral device, under an embodiment of the invention.

FIG. 2 illustrates a back face 118 of housing 110 for peripheral device 100. The back face 118 provides a compartment protruding outwards for retaining interior electrical components, such as modems or memory cards. An opening 114 provides access to the interior components of housing 110. A door not shown) may be provided over opening 114 to provide the user with access to the interior electrical components.

From the back face 118 of the peripheral device 100, the coupling mechanism may be illustrated as follows. The push members 160, 162 may be pushed a distance x into the housing, and be biased to return to an original position after being pushed inwards. The push members 160, 162 are pushed in to move translational components 170, 172 upwards. In an embodiment, translational components 170, 172 are components that have a freedom to move in the vertical direction. The push members 160, 162 have sloped or wedges surfaces that contact the translational components 170, 172. The movement of the push members 160, 162 causes the translational components 170, 172 to rise on the sloped surface provided by push members 160, 162. The vertical movement in turn causes the latch element 150, 152 (FIG. 1) to move into the engagement positions.

Figure 3:
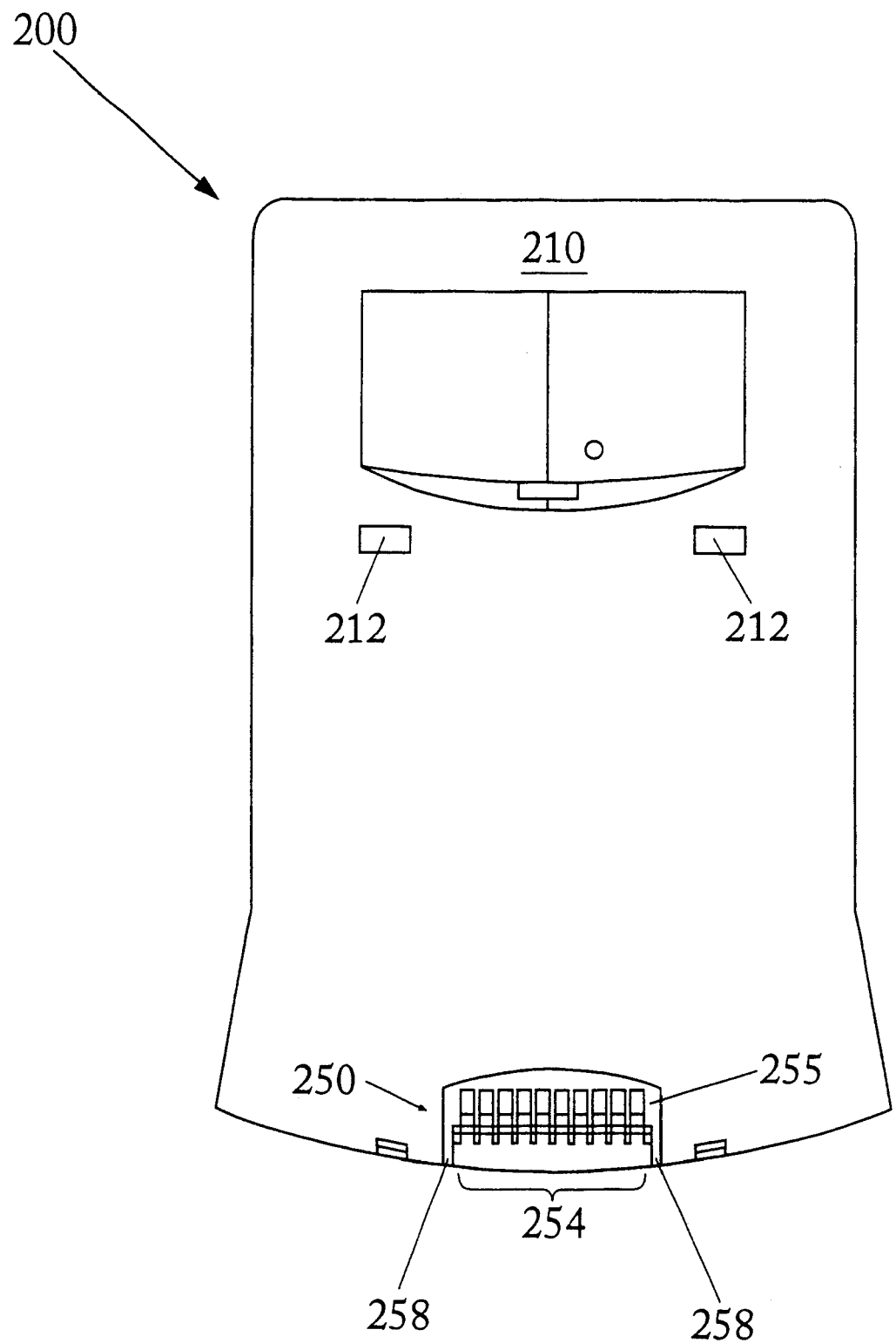
FIG. 3 is a back view of a handheld computer for use with an embodiment of the invention.

FIG. 3 illustrates a back surface 210 of a handheld computer 200, configured to mate with peripheral device 100, under an embodiment of the invention. When coupled, the back surface 210 of the handheld computer 200 rests against the front face 108 of the peripheral device 100. The latch elements 150, 152 engage and latch into mating apertures 212, 212. In the embodiment shown, two mating apertures 212, 212 are provided. The number and positions of mating apertures 212, 212 depend on the number and configuration of latch elements 150, 152 provided on front face 108 of peripheral device 100.

In an embodiment, back surface 210 includes alignment recesses 216, which engage alignment rails 112 of peripheral device 100. The back surface 210 includes access to connector 250. Preferably, connector 250 is a serial connector including an insulative body 255. The insulative body 255 includes members 258 for inserting into corresponding openings of connector 120 on handheld computer 100. When peripheral device 100 and handheld computer 200 are coupled properly, a plurality of conductive elements 254 make electrical contact with contacts 124 on peripheral device 200.

Figures 4, 8:
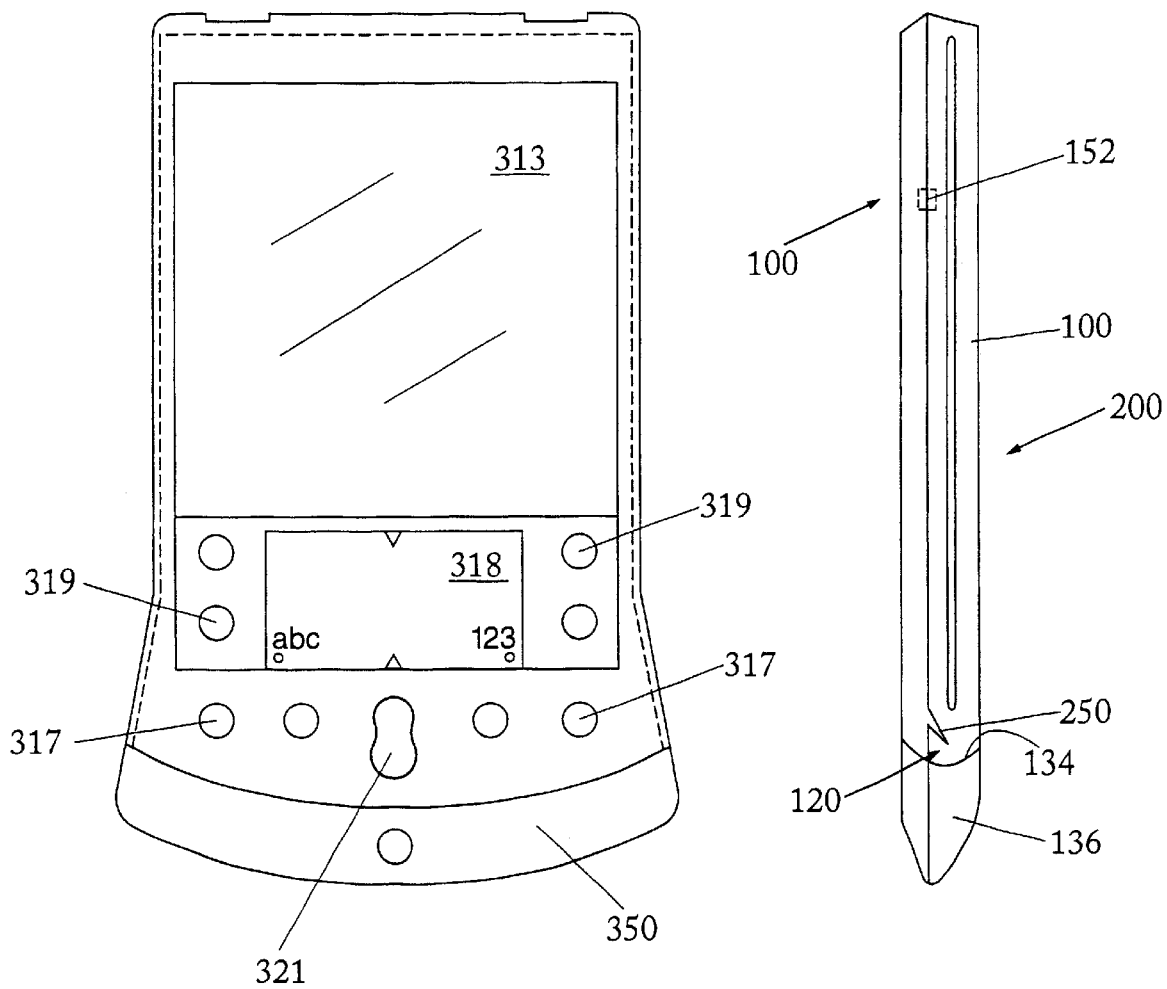
FIG. 4 is a side view of a peripheral device coupled to a handheld computer, under an embodiment of the invention.
FIG. 8 illustrates a handheld computer for use with an embodiment of the invention.

FIG. 4 illustrates handheld computer 200 coupled to peripheral device 100, under an embodiment of the invention. As shown by FIG. 4, peripheral device 100 piggy-backs on handheld computer, with front face 108 being immediately adjacent to back surface 210. The peripheral device 100 is vertically aligned relative to handheld computer 200. When coupled, the connector 120 on peripheral device 100 is mated with connector 250 on handheld computer 200. The latch element 150, 152 (shown in phantom) retains the front face of peripheral device 100 against back surface 210 of handheld computer 100.

In an embodiment, handheld computer 200 may also be propped or otherwise supported in position by ledge 134. A portion 136 may extend beyond the form factor of handheld computer 200.

C. Coupling Mechanism for Peripheral Device

Figures 5, 6, 7:
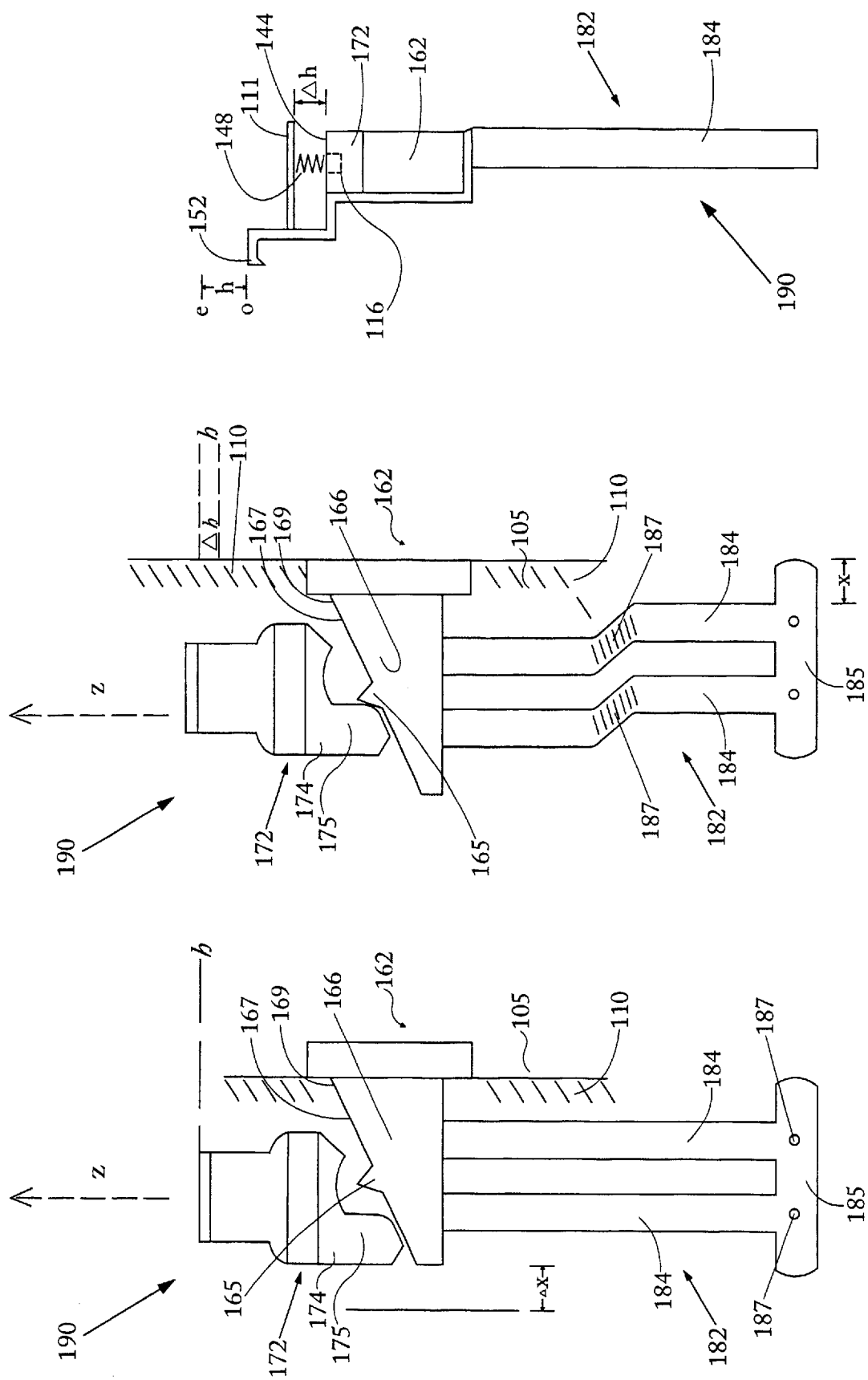
FIG. 5 illustrates a coupling mechanism for use with a peripheral device, including a latch element in an unengaged position, under an embodiment of the invention.
FIG. 6 illustrates a coupling mechanism for use with a peripheral device, including a latch element in an engaged position, under an embodiment of the invention.
FIG. 7 is a side view of the coupling mechanism, with the engaged position of the latch element shown in phantom, under an embodiment of the invention.

FIGS. 5 and 6 are front view of a coupling mechanism 190 being implemented in peripheral device 100, under an embodiment of the invention. FIG. 6 is a side-view of the coupling mechanism 190, further illustrating the movement of latch element 152. Descriptions provided with FIGS. 5–7 for components of the coupling mechanism appearing on one side of the peripheral device 100 are intended to equally apply to components of the coupling mechanism appearing on the other side of the peripheral device 100.

As shown with FIG. 5, a wedge piece 166 extends from push member 162. The wedge piece 166 may be a unitary, integrated or coupled feature of push member 162. The wedge piece 166 provides a sloped surface 167, having a raised point 169. The raised point 169 is closest to the corresponding lateral side 105 of push member 162. In an embodiment, wedge piece 166 includes a protrusion 165, positioned to extend centrally from the sloped surface 167. The push member 162 is biased when pushed a lateral distance x inward. The wedge piece 166 extends inward in conjunction with the push member 162 being pressed.

In an embodiment, push member 162 is coupled or otherwise integrated to include a controlled translation member, referred herein as guide component 182. The guide component 182 includes flex members 184 aligned parallel and joined in a base 185. The base 185 is pinned about regions 187 to an interior structure (not shown) within housing 110 so that movement of the guide component 182 is constrained to controlled deformation of the flex members 184. When push member 162 is moved inward, flex members 184 flex, while base 185 remains pinned. Preferably, the mechanism for biasing push member 162 is provided by guide component 182, as described below In this way, the guide component 182 is configured to flex laterally with movement of push member 162, while constraining rotation of push member 162 when it is pushed into housing 110. In an embodiment including flex members 184, the wedge piece 166 has almost entirely a lateral motion with insertion of push member 162. It is possible for push member 162 to pivot, but the overall pivot motion is reduced with the presence of the guide component 182.

The translational component 172 is moveably coupled to the housing to move vertically along an axis z. The translational component 172 includes a body 174 that rests against wedge piece 166. The body 174 is preferably L-shaped or otherwise dog-legged, having a contact surface 175 with wedge piece 166 and an extension 176. The extension 176 extends over the sloped surface of the wedge piece 166. The latch component 152 is coupled, integrated or otherwise unitarily constructed to extend from translational component 172 so as to move vertically with the motion of the translational component 172.

FIG. 6 illustrates the effect of inserting the coupling mechanism on translational component 172, under an embodiment of the invention. The wedge piece 166 is moved into housing 110 a lateral distance x from an original position. The sloped surface 167 is caused to slide against the contact surface 175, and as the sloped surface rises, body 174 is pushed up. The contact surface 175 abuts against or becomes proximal to protrusion 165 when the push member 162 is inserted the entire lateral distance x.

The motion of push member 162 is almost entirely lateral. This is achieved by guide component 182 preventing push member 162 from pivoting or cantilevering when push member 162 is inserted into housing 110. As will be described, the flexure properties of flex members 184, combined with the common base 184, cause push member 162 to maintain a substantially linear direction as push member 162 is pushed in from lateral side 105.

In an embodiment such as shown by FIGS. 4 and 5, each flex member 184 has an inflection region 187 that deforms when push member 162 is moved inward. Prior to push member 162 being moved in, guide component 182 is configured so that the inflection region 187 of each flex members 184 is substantially parallel. Preferably, the inflection regions 187 are joined across the same extending between lateral sides 105 of housing 110, The insertion of push members 162 causes flex members 184 to flex inward for the lateral side 105. In an embodiment, flexure properties of each flex member 184, combined with shred base 185, cause the deflection for each flex member 184 to occur at inflection regions 187. By geometry, the flex members 184 are axially stiff but laterally flexible. The separation between flex members 184, 184 is maintained by wedge piece 166 and base 185. The mismatch between lateral and axial stiffness, coupled with the end constraints and separation of flex members 184, maintains alignment between wedge piece 166 and base 185, while allowing an essentially linear constrained translation of wedge piece 166. As a result, insertion of push member 162 increases the strain-energy of flex members 184, 184, so that flex members 184, 184 act as integral return springs for push member 162. No additional spring is necessary to return push member 162 to the original position after the push member 162 is inserted into housing 110. Furthermore, the homogeneity of flex members 184 cause each flex member 184 to deform the same distance.

Therefore, the parallel nature of the flex members 184 is preserved before and during insertion of push member 162 into housing 110. That is, even after push member 162 is inserted, the distance between the two flex members 184 remains substantially the same across the length of each flex member 184. Any deviation from the parallel nature of the flex members 184 is not sufficient to affect the lateral path of the push member 162 as it is pushed inward. By use of substantially parallel, it is implied that the overall deviation in measuring the distance between flex members 184, as measured before and after push member 162 is pushed in, is less than a tenth of an inch, and preferably of the order of a hundredth of an inch or less. Furthermore, the flexure properties of guide component 182 bias the push member 162 outward.

Other embodiments may provide for deflection regions 187 to be constructed differently than other regions of the same guide members 184, so that deflection occurs only in the deflection regions 187. For example, deflection regions 187 may be thinner, more flexible, or prone to deflect easily when push member 162 is inserted into the housing 110.

FIG. 7 is a side view of coupling mechanism 190, illustrating how latch elements 150, 152 are vertically moveable with corresponding push members 160, 162. Specifically, latch member 152 may be raised into an engaged position (e)when push member 162 is inserted into the housing 110. When released, latch element 152 returns to the original position (o). The distance between the engaged position and the original position is provided by h. As exemplified, latch element 152 is hooked or otherwise bent so that it can latch into the interior of the housing of the handheld computer 200 after being raised to engage the corresponding aperture on the handheld computer's back side 210. Other elements may provide for latch elements 152 to include features or multiple elements that are insertable into the mating apertures 212 of handheld computer 200, but preclude or impede withdrawal therefrom, such as through use of another mechanism.

In an embodiment, translational component 172 is biased against a structure 111 in the housing 210 of handheld computer 200. For example, a spring 148 may be retained in a dimple 146 or impression on a top surface 144 of the translational component 172. When the push member 162 is pushed in, the translational component 172 is directed upwards. The latch element 152 moves from position o to position e. The spring 148 is biased against the structure 111. This make the translational component 172 abut or otherwise be in contact with push member 162 both when push member 162 is pushed in or relaxed.

Under an embodiment of the invention, the peripheral device 100 can be detachable coupled to the handheld computer 200 in the following manner. The user aligns the handheld computer so that a connector of the peripheral device is mated with the connector of the handheld computer. The back surface of the handheld computer is brought against the front of the peripheral device. The user grips the peripheral device in locations where push member 162 is provided to effectuate a latch member 152 to engage and latch onto the handheld computer.

D. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A peripheral device coupleable to a handheld computer, the peripheral device comprising:
   a housing including a front face and a back face, a pair of lateral sides of the housing defining a width of the peripheral device, and a top and bottom of the peripheral device defining a length of the peripheral device;
   a printed circuit board contained within the housing;
   a connector for extending communications to the handheld computer;
   a latch element configured to couple the peripheral device to the handheld computer, the latch element being moveable to latch into an aperture of the handheld computer, wherein the latch element is moveable from an original position to an engaged position for inserting into an aperture of the handheld computer, and the latch element is movable from the engaged position back to the original position to latch into the aperture of the handheld computer; and
   a push member moveable coupled to the housing on one of the lateral sides, the push member being configured to cause the latch element to move and latch into the aperture of the handheld computer when the push member is moved into the housing.

2. The peripheral device of claim 1, wherein the latch element is moveable in a vertical direction along the length of the peripheral device.

3. The peripheral device of claim 2, wherein the push member is positioned to move in a lateral direction along the width of the peripheral device.

4. A coupling mechanism for connecting a peripheral device to a handheld computer, the peripheral device including a housing having a top, a bottom, the coupling mechanism comprising:
   a push member moveably coupled to the housing to move a distance into the housing from an original position;
   a translation component coupled to the push member to move in a vertical direction towards the top or bottom of the housing when the push member is moved the distance into the housing; and
   a first latch element coupled to the translational component and positioned within the housing to move into an engaged position for engaging a first aperture of the handheld computer when the push member is moved the distance, the first latch element being shaped relative to the first aperture to couple the peripheral device to the handheld computer when the first latch element is moved away from the engaged position by the push member being moved back towards the original position.

5. The coupling mechanism of claim 4, wherein the push member biases to move outward when moved into the housing.

6. The coupling mechanism of claim 4, wherein the translational component to move towards the top of the housing when the push member is moved into the housing.

7. The coupling mechanism of claim 4, further comprising an interior slope extending inward from the push member, the interior slope being moveable against the translational component to cause the translational component to move towards the top of the housing.

8. The coupling mechanism of claim 7, wherein the translational component is fixed to move only vertically with respect to the top and bottom of the housing.

9. The coupling mechanism of claim 8, wherein the translational component includes a contact surface that slides against the interior slope of the push member as the push member is moved inward the distance.

10. The coupling mechanism of claim 9, wherein the translational component moves vertically as the translational component slides against the interior slope of the push member.

11. The coupling mechanism of claim 6, wherein the latch element includes a hooked extension to extend into the first aperture of the handheld computer.

12. A coupling mechanism extending between a peripheral device and a handheld computer, the peripheral device including a top and a bottom, the coupling mechanism comprising:
    a push member moveably coupled to the housing to move a lateral distance into the housing from an original position, the push member providing a sloped interior surface extending therefrom;
    a wedge piece coupled to the push member to move along the sloped interior surface when the push member is pushed inward the lateral distance;
    an latch element coupled to the wedge component to move vertically as the wedge piece moves along the sloped interior surface of the push member, the latch element being moveable into an engaged position for engaging an aperture of the handheld computer when the push member is moved the lateral distance, the latch element being shaped relative to the first aperture to couple the peripheral device to the handheld computer when the latch element is moved away from the engaged position by the push member being moved back towards the original position; and
    a guide component that moves with the wedge piece to maintain a lateral motion for the wedge piece.

13. The coupling mechanism of claim 12, wherein the guide component reduces pivoting by the wedge piece as the push member is moved the lateral distance.

14. The coupling mechanism of claim 13, wherein the guide component includes a pair of flex members fixed to a common base.

15. The coupling mechanism of claim 14, wherein the flex members are positioned to be parallel, and wherein the flex members joined to the common base, but physically separated so as to move together when the push member is moved the lateral distance.

16. The coupling mechanism of claim 15, wherein the flex members are joined so as to move together and remain substantially parallel when the push member is moved the lateral distance.

17. The coupling mechanism of claim 12, wherein the push members are biased to move outward when the push members are moved inward.

* * * * *